United States Patent Office 3,292,789
Patented Dec. 20, 1966

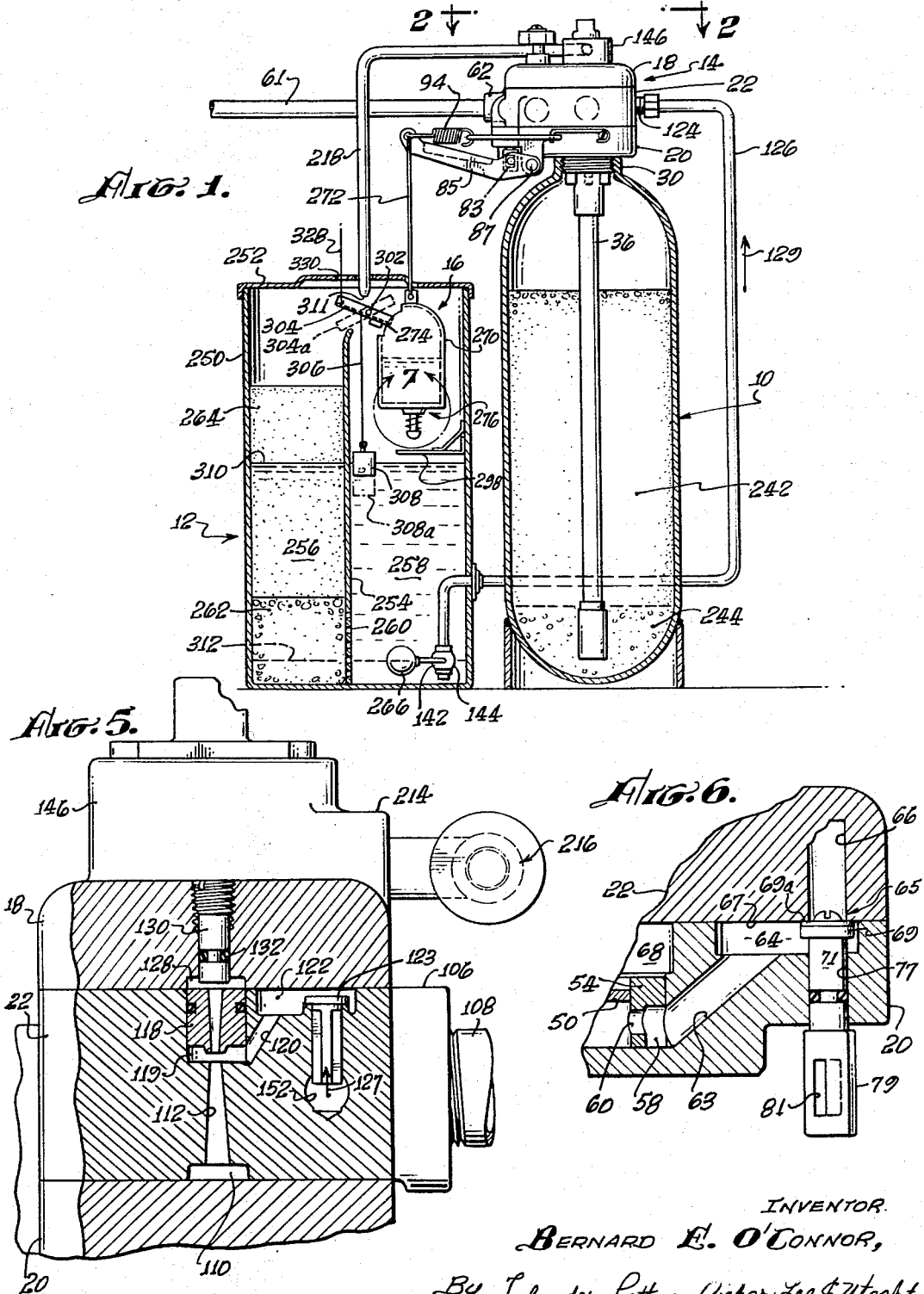

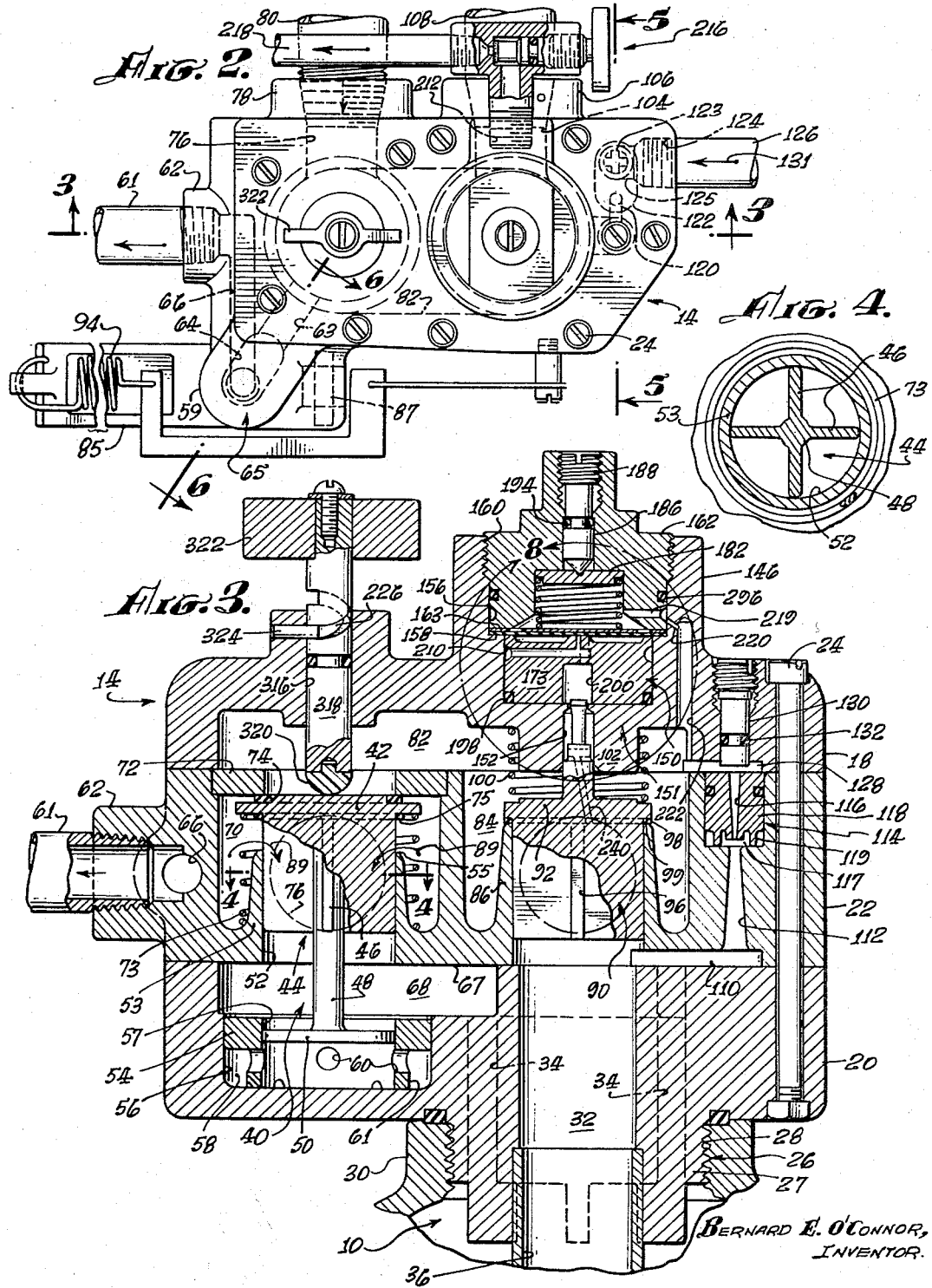

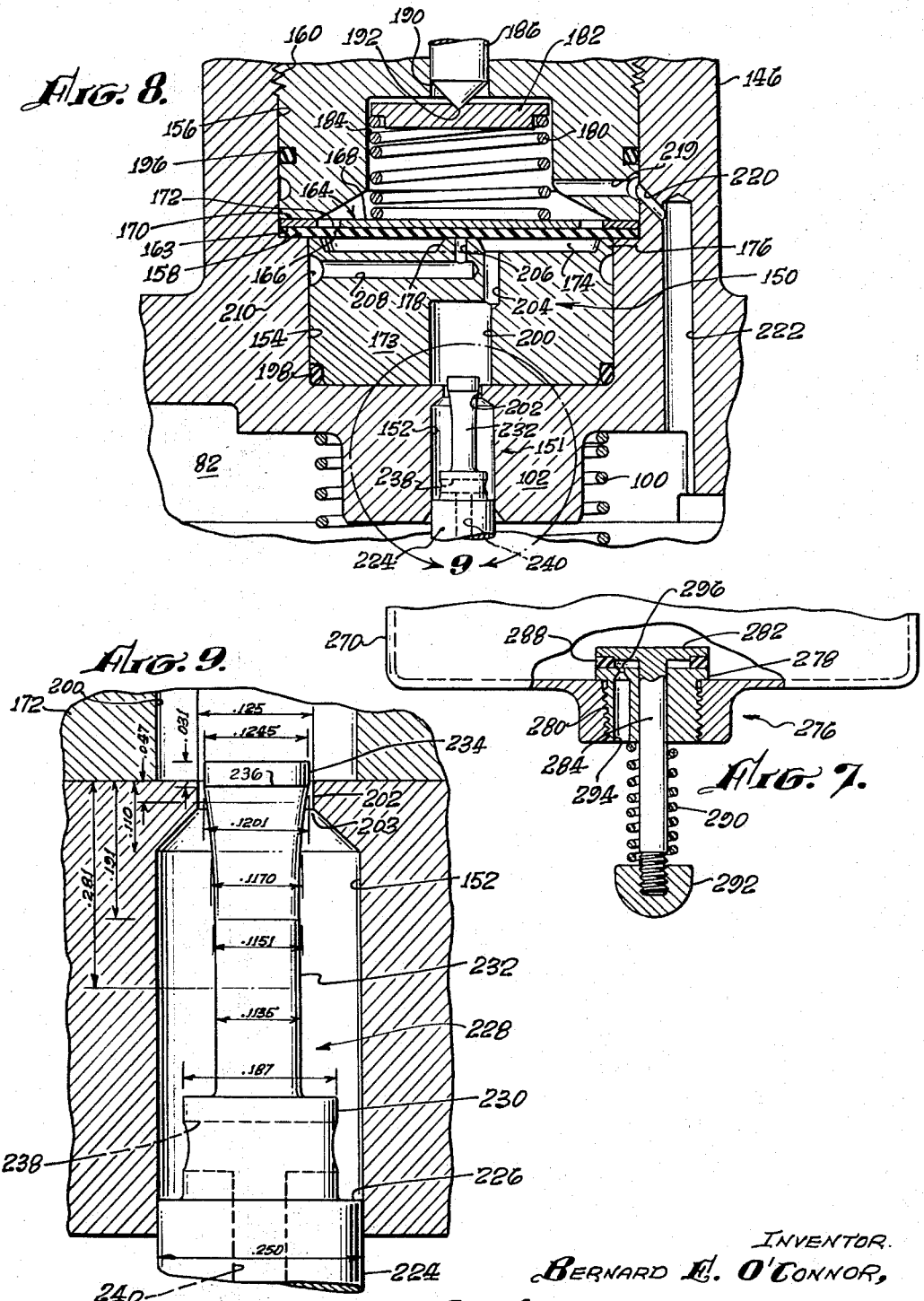

3,292,789
AUTOMATIC WATER SOFTENING SYSTEM
Bernard E. O'Connor, 8904 Rindge Ave.,
Playa Del Rey, Calif. 90291
Filed Feb. 23, 1965, Ser. No. 434,564
10 Claims. (Cl. 210—105)

This application is a continuation-in-part of co-pending application Ser. No. 368,299, filed May 18, 1964.

This invention relates generally to water softening apparatus, and more particularly to a fully automatically controlled water softening system.

In the conventional base exchange or zeolite process of softening hard water by passing it in contact with zeolite, certain soluble constituents of calcium and the like compounds in the hard water, are replaced by sodium from the zeolite to produce the softening effect. After a certain amount of hard water has been softened, the exchange material of the zeolite becomes sufficiently exhausted to lose its effectiveness, and thus, it becomes necessary to interrupt the water softening operations at intervals to regenerate the zeolite, and such regeneration is accomplished by flushing the zeolite bed with a certain amount of concentrated sodium chloride brine. Following each such regeneration, it is necessary to wash the zeolite with sufficient fresh water to remove the brine, preparatory to resuming the water softening operation, and for best results in both the regeneration and washing process, the brine and wash water are preferably passed through the zeolite bed in a direction in reverse to that employed in the softening process.

Thus, the zeolite system of water softening requires continuous, properly timed and controlled repetition of the several, separate, sequentially performed steps in each of the cycles of operation of the water softening process.

Heretofore, numerous different arrangement of apparatus have been employed for accomplishing the beforementioned water softening process steps, and the control thereof has been accomplished by either manual manipulation of such apparatus, or where automatic apparatus has been employed for such purpose, the timing and sequence of such automatic operation has been dependent upon arbitrarily determined manipulation without precise determination of when such regeneration cycles should be initiated and for what duration each of the treating steps thereof should be continued. Consequently, there has been no satisfactory way of determining accurately when such regeneration process cycles should be performed and for insuring the performance of such process when needed.

It is accordingly, a primary object of this invention to furnish a water softening system the operation of which is substantially wholly automatic.

It is another object of this invention to provide a water softener system in which the frequency of performance of the regeneration cycles is self determined by the quantity of water subjected to the water softening treatment.

It is another object of this invention to provide an automatic water softening system which is automatically controlled by means which is not dependent upon any source of energy for its operation other than the treated water itself.

It is a still further object of this invention to provide an automatic water softening system which is wholly self contained and not dependent upon any external source of control or power for its operation but which is actuated entirely by the water subjected to treatment.

These and other objects and advantages and features of novelty of this invention will be evident hereinafter.

In the drawings which show a presently preferred embodiment of this invention, and in which like reference characters designate the same or similar parts throughout the several views:

FIGURE 1 is a view, partly in elevation and partly in vertical section, of the general assembly of a water softening system embodying and employing the apparatus of this invention.

FIGURE 2 is a plan or top view of the control valve unit portion of the apparatus, as viewed from line 2—2 of FIGURE 1.

FIGURE 3 is an enlarged, vertical sectional view of the control valve unit of the apparatus and a fragmentary portion of a water softening tank upon which it is mounted, as taken on line 3—3 of FIGURE 2.

FIGURE 4 is a transverse, sectional detailed view taken on line 4—4 of FIGURE 3.

FIGURE 5 is an enlarged, vertical sectional view taken on line 5—5 of FIGURE 2.

FIGURE 6 is an enlarged, fragmentary, vertical sectional view taken on line 6—6 of FIGURE 2.

FIGURE 7 is an enlarged, fragmentary, detailed view of the portion of the apparatus encircled within circle 7 of FIGURE 1.

FIGURE 8 is an enlarged, fragmentary, detailed view of the portion of the apparatus encircled within circle 8 of FIGURE 3.

FIGURE 9 is an enlarged, fragmentary, detailed view of the portion of the apparatus encircled within circle 9 of FIGURE 8 showing dimensions for one operable example of a design of the metering valve portion of the apparatus.

APPARATUS

Referring first primarily to FIGURE 1, the general assembly of the apparatus comprises as its principal components; a water softener tank 10, a brine generating and storage tank 12, a cycle control valve unit 14 mounted upon the upper end of the water softener tank 10, and automatic control apparatus 16 contained within tank 12 and operatively coupled to the cycle control valve 14.

Referring next, primarily to FIGURES 2 and 3, the cycle control valve unit 14 is constructed with a housing composed of three superposed body sections, namely an upper cap section 18, a lower base section 20, and an intermediate body section 22, said sections being bolted together face-to-face by means of a plurality of vertical through bolts as shown at 24. The base section 20 is formed on its underside with an integral, downwardly extending, tank attachment fitting shown generally at 26 which includes an externally threaded nipple portion 27 which makes threaded connection at 28 within the top opening collar 30 of the water softener tank 10. The tank attachment fitting 26 is formed with separate, coaxial, inner and outer passages 32 and 34 respectively, the inner passage 32 making connection with the top end of a manifold pipe 36, which extends downwardly within the water softener tank 10 to a point adjacent the bottom thereof, and the outer passage 34 being segmentally annular in form and communicating directly with the top portion of the water softener tank 10, surrounding the upper end portion of the manifold pipe 36.

Contained within the cycle control valve housing 18, 20, 22 is a slide valve assembly shown generally at 40, formed with an upper, valve head 42 carried upon the upper end of the open-sided X-shaped valve guide body 44 which, in transverse section, as shown in FIGURE 4, is formed of four integral, radially extending webb members 46 with open flow spaces therebetween. The lower end of the valve guide body 44 is attached, through an intermediate, coaxial valve stem 48 of reduced diameter, to a lower valve piston 50. The guide body 44 carrying the valve head 42, valve stem 48 and valve piston 50, is vertically slidable in a valve guide bore 52 formed in an upstanding tubular shaped guide 53 formed in the intermediate housing section 22. The valve piston 50 is vertically slidable within the bore 57 of a removable annular valve sleeve 54, press fitted coaxially within a cylindrical recess 56 formed in the lower portion of the housing base section 20. The annular valve sleeve 54 is L-shaped in radial section, thereby enclosing a surrounding annular space 58 in the outer, lower portion of the recess 56. A plurality of radially directed ports 60 extend through the vertical leg portion 61 of the sleeve 54 interconnecting the bore 57 of the valve sleeve 54 and the surrounding annular space 58.

The annular space 58 is connected with a drain outlet port 62 extending from the left-hand edge portion of the intermediate body portion 22, as viewed in FIGURES 2 and 3, by way of a valved internal passage arrangement, a portion of which is best shown in FIGURE 6, and which consists of a duct 63 leading from the annular space 58 to a valve cavity 64, formed within the protruding corner portion (shown at 59 in FIGURE 2) of the walls of the base section 20 and containing a drain valve 65, and thence, the passage continues through duct 66 formed in the intermediate section 22 of the control valve housing, to connection with the beforementioned drain outlet port 62. The outlet port 62 may be connected to a drain pipe 61 leading to a suitable disposal connection, not shown. The drain valve 65 consists of a valve head 69, normally seated on annular seat 69a and vertically movably supported upon a valve plunger member 71, which is in turn vertically slidably supported in a guide bore 77 extending vertically down from the valve cavity 64 through the lower surface of the beforementioned corner portion of the lower base section 20. The lower, external end of the valve plunger member 71 is formed with an enlarged end fitting 79 having an axially elongated rectangular slot 81 therethrough which receives a cross-pin 83 (see FIGURE 1) of a drain valve actuating lever 85. The drain valve actuating lever 85 is pivotally supported at its inner end on a pivot 87 fixed to the base section 20 of the control valve unit 14.

Surrounding the valve stem 48 of the slide valve assembly 40 and enclosed between the upper portion of the cylindrical recess 56 and the adjacent lower surface 67 of the intermediate valve unit body section 22 is a horizontally elongated chamber 68, with which the lower end of the cylindrical, valve guide bore 52 and the upper end of the bore 57 of the annular valve sleeve 54 communicate. The chamber 68 also communicates adjacent its right-hand end, as viewed in FIGURE 3, with the plurality of segmentally annular passages 34, which lead through the tank attachment fitting 26 into the top portion of the water softener tank 10, as beforedescribed.

Surrounding the tubular shaped guide 53 within the intermediate body section 22, is a generally annular chamber 70, containing at its upper end an annular valve seat insert 72, upon the inner, lower edge portion of which the upper valve head 42 is urged into closing engagement by means of a helical valve spring 73. A seal ring 74 is carried on the upper surface of the valve head 42 for making sealing engagement with the aforesaid valve insert 72, when the slide valve assembly 40 is in its upper position, as shown in FIGURE 3. A similar, valve seal ring 75 is carried on the lower surface of the valve head 42 for making sealing engagement with the annular valve seat 55 formed by the upper end of the tubular guide 53, when the slide valve assembly 40 is in a lower position, as hereinafter described.

The annular chamber 70 communicates at its far side, as viewed in FIGURE 3, through a rearwardly directed duct 76, as best shown in FIGURE 2, with an inlet port 78 on the rearward exterior of the intermediate body section 22, said port 78 being adapted for threaded connection thereto of a raw, fresh water supply pipe as shown at 80.

Inclosed under the upper cap section 18 of the control valve housing, and above the upper surface of the intermediate body section 22, is an upper, generally dome-shaped chamber 82, which communicates on its lower side with the central opening formed through the annular valve seat insert 72, and also communicates at its right-hand side portion, as viewed in FIGURE 3, with another generally annular, upwardly facing chamber 84 formed in the intermediate housing body section 22. The lowermost portion of the annular chamber 84 surrounds an upstanding tubular-shaped valve guide 86, having an inner cylindrical, valve guide bore 88.

Vertically sildably supported within the valve guide bore 88 of the tubular shaped valve guide 86 is a slide valve assembly shown generally at 90, the lower portion of which is similar to the hereinbefore described upper portion of the slide valve assembly 40, and which is formed with a valve head 92 adapted to rest upon a valve seat 99. The valve head 92 is carried upon the upper end of an open-sided X-shaped valve guide body 96 which, in transverse section, is formed of four, integral, radially extending web members having open flow spaces therebetween, similar to that shown in FIGURE 4. A valve seal ring 98 is carried on the lower surface of the valve head 92, for making sealing engagement with the upper concentric valve seat 99 formed by the upper end of the valve guide 86, when the slide valve assembly 90 is in its lowermost position, as shown. A helical valve spring 100 extending under compression between an upper centering boss 102 formed on the underside of the upper cap section 18, and the top surface of the valve head 92, serves to bias the beforedescribed slide valve assembly 90 toward its lowermost position shown in FIGURE 3, in which the valve head 92 is seated upon the valve seat 99 of the top end of the valve guide 86, thereby closing the top end of the valve guide bore 88.

Extending vertically through a bore 316 which passes through the upper wall of the upper cap section 18 of the control body 14 coaxially of the slide valve assembly 40, is a control plunger 318, the inner lower end 320 of which is positioned adjacent to and adapted to engage the top surface of the valve head 42. The outer upper end of the plunger 318 carries a hand controlled knob 322. A lateral pin 324, which is fixed in a pin hole in the cap section and which extends into a spiral groove 326, cut around the exterior of the plunger 318, serves to cause the plunger to move axially upon rotation thereof, in one direction by the knob 322, such that the valve assembly 40 may be depressed by the lower end 320 of the plunger 318 against the force of valve spring 73 and retained in such depressed position with the valve head 42, enclosed contact with the valve seat 55 until manually released by opposite rotation in the control knob 322.

Chamber 84 communicates at its far side, as viewed in FIGURE 3, through a rearwardly directed passage 104, as shown in FIGURE 2 with an outlet port 106, positioned on the rearward exterior side of the intermediate body section 22, said port 106 being adapted for threaded connection thereto of a softened water outlet pipe as shown in 108. The lower end of the valve guide bore 88 communicates coaxially with the before-mentioned inner passage 32 in the lower base section 20 of the housing, and thence through the tank attachment fitting 26 with the top end of the manifold pipe 36, which extends downwardly into the water softener tank 10. Also communicating with the inner passage 32 through a lateral duct 110, is a discharge expansion passage 112 of a jet or venturi type pump shown generally at 114.

The jet or venturi pump shown generally at 114, in addition to the beforementioned discharged expansion passage 112, includes a converging, conical, jet nozzle passage 116 formed in a cylindrical insert 118, the converging discharge end of which nozzle passage is coaxially aligned with, but spaced axially a short distance from the inlet end of the expansion passage 112, thereby forming a contracted, venturi throat section at 117. Surrounding the throat section 117 between the discharge end of the jet nozzle passage 116 and the inlet end of the expansion passage 112, is a generally annular suction port 119 formed by a plurality of slots cut radially into the lower end of the cylindrical insert 118. Suction port 119, as best shown in FIGURE 5, communicates by way of ducts 120 and 122, check valve 123 and duct 125, with a threaded exterior port 124 (see FIGURE 1) opening out through the right-hand end of the housing, as viewed in FIGURE 1 and which is adapted for threaded connection thereto of a suitable tubing 126, which leads to the brine tank 12, as and for the purpose hereinafter described. The check valve 123 acts to permit fluid flow only in the inward direction indicated by the arrows 127, 129 and 131.

The inlet of the jet nozzle 116 is connected through a lateral passage 128 enclosed between the lower surface of the upper cap section 18 and the upper surface of the intermediate body section 22, with the right-hand end portion, as viewed in FIGURE 3, of the hereinbefore described annular chamber 84 and dome-shaped chamber 82. A nozzle flow adjustment valve screw 130 is threaded through the upper cap section 18, coaxial with the axis of the jet nozzle 116, and by rotational movement thereof the lower end of the valve screw 130 may be moved axially toward or away from the inlet end of the jet nozzle 116 to act as a throttle means to adjust the rate of flow entering the inlet of the jet nozzle 116. An O-ring 132 is provided in an annular groove formed around the lower portion of the body of the adjustment valve screw 130 for making a slidable and rotatable fluid-tight seal between the body thereof and the surrounding valve screw bore.

Referring again, primarily to FIGURES 1 and 2, the tubing 126 leading from port 124 of the control valve 14 makes connection at 142 with a float operated valve 144 located within and adjacent the bottom of the brine well portion 258 of the brine generating and storage tank 12. Tubing 126 serves as the brine supply line from the brine tank 12 to the cycle control valve unit 14 during the zeolite regeneration phase of the cycle of operation of the apparatus, as is hereinafter more fully described in connection with the operation of the system.

The water softener tank 10, in operation, contains a suitable bed of zeolite 242 which rests upon a relatively shallow filter body 244 of gravel and sand in the bottom thereof and into which the lower end of the manifold pipe 36 extends. The filter body 244 serves to prevent zeolite particles from being carried out of the tank 10 through the manifold 36 during certain stages of the operation of the system.

Referring now to FIGURES 1, 2, 3, 8 and 9, the upper cap section 18 of the housing of the control valve unit 14 is formed with an upwardly extending, generally cylindrical shaped regulator valve dome 146, containing therein a metering and regulating valve assembly shown generally at 150 and 151 respectively, which in response to the control apparatus 16, determines the frequency and duration of the several steps of the cycles of operation of the water softening system, as will be hereinafter more fully described.

The regulator valve dome 146 is formed with a vertical bore therethrough of stepwise varying inside diameter, such bore having a bottom bore section 152 of minimum inside diameter extending coaxially through the bottom of the regulator valve dome, an intermediate bore section 154 of intermediate inside diameter, and a top bore section 156 of maximum inside diameter extending through the top end of the regulator valve dome 146. An upwardly facing annular shoulder 158 is formed at the juncture of the intermediate bore section 154 and the upper bore section 156. The upper bore section 156 is provided, adjacent the upper end thereof, with internal threads 160 into which is threaded a dome head 162. Clamped between the lower, downwardly facing marginal portion 163 of the dome head 162 and, the upwardly facing annular shoulder 158 as best shown in FIGURE 8, is a regulating valve diaphragm assembly shown generally at 164. The regulating valve diaphragm assembly 164 consists of a lower, relatively thin, imperforate disc-shaped diaphragm 166, composed of a flexible, resilient elastomer such as rubber or neoprene, an upper relatively thin disc-shaped piston member 168 made of a relatively rigid material such as metal and having an outside diameter substantially less than the outside diameter of the resilient diaphragm 166, and a rigid, upper marginal retainer ring 170, having an inside diameter substantially greater than the outside diameter of the piston member 168, thereby providing an intermediate annular portion 172 of the resilient diaphragm 166 which is unsupported between the aforesaid inside diameter of the retainer ring 170 and the outside diameter of the piston member 168, and which is, therefore, relatively free for axial flexure. The diaphragm 166 piston member 168 and retainer ring 170 are preferably bonded together at their surfaces of mutual contact by vulcanization or other suitable well known means for bonding elastomers to metal surfaces.

Contained within the intermediate bore section 154 of the regulator valve dome 146 is a generally cylindrical regulator valve insert 173, the upper end of which is formed with a coaxial, upwardly facing, annular depression 174 defined by an outer, upwardly projecting annular rim 176, and a central, upwardly projecting diaphragm valve seat 178. The upper edge of the annular rim 176 makes clamping engagement with the adjacent lower marginal surface of the diaphragm 166 directly below the retainer ring 170. The regulator diaphragm assembly 164 is biased toward engagement of the central, lower surface of the diaphragm 166 with the upper end surface of the valve seat 178 by means of a helical valve spring 180, which acts under compression between the top surface of the piston member 168 and the lower surface of a disc-shaped spring seat 182, which is vertically adjustably contained within the upper portion of a coaxial cylindrical recess 184 formed in the lower portion of the dome head 162. Axial positioning adjustment of the spring seat 182 to adjust the force of the spring upon the piston member 168 is provided by means of a regulator adjustment screw 186 which is vertically adjustable in position within threads 188 in the top of the dome head 162. The lower end of the regulator adjustment screw 186 is formed at its lower end with a point 190, which engages a depression 192 formed centrally in the upper surface of the spring seat 182. Suitable O-ring seals are provided at 194, surrounding an intermediate portion of the regulator adjustment screw 186, at 196 surrounding an intermediate portion of the dome head 162 and at 198, around the lower edge portion of the regulator valve insert 173 to prevent leakage thereby.

The regulator valve insert 173 is formed with a coaxial, downwardly opening, cylindrical cavity 200, the lower open end of which coaxially communicates with the upper end of the beforementioned bottom bore section 152 of the lower end portion of the regulator valve dome 146. The upper end of the bottom bore section 152 is formed with a still further reduced diameter portion forming a relatively short cylindrical aperture 202, hereinafter referred to as the metering valve aperture.

The upper end of the cavity 200 communicates through a duct 204 with the beforementioned annular depression 174 formed in the upper end of the regulator valve insert 173. The diaphragm valve seat 178 is provided with a central outlet duct 206, communicating at its lower end with a lateral flow passage 208, which in turn, makes connection with an outwardly facing annular groove 210 formed around the exterior surface of the regulator valve insert 173. The annular groove 210 communicates through a rearwardly directed passage 212 formed in the regulator valve dome 146, with an outlet port 214, into which is threadly connected a control valve 216 to which, in turn, is threadly connected an outlet pipe 218 which leads to the beforementioned automatic control apparatus 16 contained within the brine generating and storage tank 12, the function and mode of operation of which will be hereinafter described.

The cylindrical recess 184 enclosed within the dome head 162 above the diaphragm assembly 164 is maintained in communication with the interconnected chambers 82 and 84, formed in the upper cap section 18 and the intermediate body section 22 of the control valve unit housing, by way of ducts 219, 220, and 222, as best shown in FIGURE 8.

Extending coaxially upwardly from the top surface of the valve head 92 is a cylindrical valve supporting stem 224, the upper end of which extends vertically slidably within the lower end portion of the bottom bore section 152 of the regulator valve dome 146, the fit between the outside diameter of the bottom bore section 152 being such as to permit relatively free axial sliding motion therebetween but such as to prevent substantial leakage of liquid axially therebetween. Extending coaxially upwardly from and formed integrally with the upper end 226 of the valve stem 224 is a metering body 228 having a generally cylindrical lower base portion 230, and an upper, tapered metering pin 232. The upper end portion of the metering pin 232 extends coaxially and axially movable through the hereinbefore mentioned metering valve aperture 202. The metering pin 232 is formed with an axially relatively short untapered cylindrical upper end portion, as shown at 234. The lower annular boundary line 236 formed at the juncture of the untapered cylindrical upper end portion 234 and the tapered portion therebelow, is normally positioned, under static conditions of operation, just within and closely adjacent the plane of the upper end opening of the metering valve aperture 202, as best shown in FIGURE 9. From the before-mentioned lower boundary line 236 of the cylindrical upper end portion 234, the metering pin is formed with a downwardly convergingly tapered outside surface, the diameter of which varies axially in accordance with a predetermined function, one practical example of which is illustrated and represented by the dimensions shown in FIGURE 9, whereby upon movement of the metering pin 232 axially upwardly from the position illustrated in FIGURE 9, the cross sectional area of the annular clearance space 203 between the inside of the metering valve aperture 202 and the outside surface of the valve metering pin 232 will likewise vary in accordance with a predetermined function, thereby providing for flow of fluid therethrough at a rate which likewise bears a predetermined functional relationship to the axial displacement of the metering valve body 228 relative to the metering valve aperture.

The lower base portion 230 of the metering valve body 228 and the valve stem 224 are provided with internal ducts 238 and 240, through which the space surrounding the metering valve body 228 within the bottom bore section 152, communicates with the space below the lower surface of the valve head 92.

Referring again, mainly to FIGURE 1, the brine generating and storage tank 12 comprises a cylindrical shell 250, closed at the top by a removable cover 252 and containing a transverse, vertical dividing wall 254, separating the interior of the tank into a rock salt storage compartment 256 and a brine storage well 258. The bottom portion of the dividing wall 254 is provided with perforations 260, interconnecting the bottom portion of the salt storage compartment 256 and the brine storage well 258, and a conventional gravel filter bed 262 is provided in the bottom portion of the rock salt storage compartment 256, covering the perforations 260. In operation, a quantity of rock salt as shown at 264, is contained in the salt storage compartment 256, above the upper surface of the beforementioned gravel filter bed 262. The hereinbefore mentioned float valve 144 is provided with a valve operating float 266, the effect of which is to maintain the valve 144 open at all times when the level of the brine in the brine well 258 is above the inlet of the float valve 144 and to close the float valve 144 when the liquid level in the brine well 258 is lowered to a lower limiting level illustrated by broken line 312 slightly above the float valve inlet.

Referring again to the hereinbefore mentioned automatic control apparatus, shown generally at 16 within the upper end of the brine tank 12, this apparatus comprises a control bucket 270 vertically movably supported in the upper portion of the brine well 258 by a flexible suspending means 272, connected to the outer end of the drain valve actuating lever 85. The control bucket 270 is provided with an upper inlet opening 274 and a bottom dump valve shown generally at 276. The dump valve 276, as best shown in FGURE 7, comprises a valve seat fitting 278 threaded at 280 into the bottom of the control bucket 270, and through which is vertically slidably supported a valve comprising a valve head 282 carried on the upper end of a valve stem 284. The valve head 282 carries on the lower outer marginal portion thereof, an annular gasket 288, which when the dump valve is in its closed position as shown in FIGURE 7, makes sealing engagement with the upper adjacent marginal portion of the valve seat fitting 278. The dump valve 276 is normally biased to its closed position, as shown in FIGURE 7, by means of a helical valve spring 290, which acts under compression between the lower side of the dump valve seat fitting 278 and the upper surface of a valve spring retainer nut 292, screwed onto the lower end of the valve stem 284.

The dump valve seat fitting 278 is provided with a drain passage 294 extending vertically therethrough, the upper end of which is formed with an orifice 296 which, when the valve is in its closed position as shown in FIGURE 7, is closed by the valve head 282. The size of the orifice 296 is gauged to determine the time required for discharge of a given accumulated quantity of water from the control bucket 270 for controlling the timing of certain of the steps and the cycling frequency of operation of the system as is more fully explained hereinafter in connection with the description of the operation of the system.

A dump valve actuating bracket 298 is attached to the inside of the brine well 258 in alignment with the lower end of the spring retainer nut 292 carried on the lower end of the valve stem 284 of the dump valve 276. In operation, when the control bucket 270 is in its upper position, as shown in FIGURE 1, the lower end of the spring retainer nut 292 is positioned a distance above and out of contact with the dump valve actuating bracket 298, but when the control bucket 270 is in its lowermost position, the spring retainer nut 292 of the dump valve 276 is brought into forceful contact with the valve actuating bracket 298, thereby forcing the dump valve 276 open by moving the valve stem 284 and valve head 282 upwardly relative to the valve seat fitting 278.

Pivotally supported on a bearing 302, extending crosswise of the upper, interior of the cylindrical shell 250 of the brine generating and storage tank 12, is a channel-shaped tray 304, which is so weighted relative to its pivot point as normally to take the sloping position shown in solid lines at 304, in which the left-hand end of the tray 304 is elevated and the right-hand end thereof is lowered such as to be capable of directing liquid falling upon it into the inlet opening 274 of the control bucket 270.

Attached to the tray 304, at a point to the left of its pivot point, by means of a suitable link member 306 which extends downwardly into the upper end portion of the brine well 258, is a float 308. The float 308 is of such weight and buoyancy as to float on the surface 310 of the brine, when the brine level is at or relatively close to its maximum height as indicated at 310 in FIGURE 1, thereby relieving the tray 304 of the weight of the float 308 to permit it to take the position thereshown in solid line 304. However, when the brine level drops a short distance below that shown at 310 in FIGURE 1 at which the float 308 is unsupported by the liquid and lowers to a limiting position approximating that shown in broken lines at 308a, the tray is thereby caused to pivot to the position shown in broken lines at 304a in FIGURE 1, in which position the right-hand end of the tray is elevated and the left-hand end thereof is lowered such as to be capable of directing liquid falling upon it into the upper end of the salt storage compartment 256.

A tell tale rod 328 is pivotally attached to the left-hand end of the tray 304 and extends vertically, slidably through an opening 330 in the cover 252 of the brine tank 12. When the tray is in the position shown in broken lines at 304a, the rod 328 is lowered to a vertical position barely visible above the top of the cover 252, but when the tray is in the position shown in solid lines 304 the rod 328 is elevated such that its upper end extends well above the upper surface of the cover 252, thereby signaling an impending actuation of the regenerating slip of the operating cycle, as will be more fully described hereinafter.

The hereinbefore mentioned outlet pipe 218 leading from the control valve unit 14, enters the cover 252 of the brine generating and storage tank 12, with the discharge end 311 thereof positioned in alignment with the mid-portion of the tray 304, whereby, depending upon the position of the tray 304, water discharge from the discharge end 311 of the pipe 218 will fall upon the tray 304 and be diverted either into the inlet opening 274 of the control bucket 270 or into the top portion of the rock salt storage compartment 256.

OPERATION

The operation of the apparatus is as follows:

Let it be assumed first, for a convenient point at which to start the description of the operation, that the cycle of operation of the apparatus is at a stage just following completion of the sequence of the zeolite regeneration and washing steps and that the system is again ready to supply demands for softened water made by facilities connected to the soft water outlet pipe 108. At this stage of the operation of the apparatus, the liquid level of the brine in the brine generating and storage tank 12 will have been lowered from the full level shown at 310 to a lower substantially empty level such as that illustrated by broken line 312 by reason of prior withdrawal of brine therefrom for the regeneration of the zeolite. With the liquid level at 312 the float 308 will be unsupported by the liquid in the brine well 258 and consequently it and the tray 304 will occupy the positions illustrated by broken lines 308a and 304a respectively, with the tray in position to direct water from pipe 218 and nozzle 311, into the top of the rock salt storage compartment 256. The control bucket 270 at this time will occupy its uppermost position as shown in FIGURE 1, with the drain valve 65 closed.

As demands for softened water are made, at varying rates and for varying intervals of time, resulting in outflow of such soft water from the outlet pipe 108, raw water enters under pressure through the water supply pipe 80 into the inlet port 78 of the cycle control valve unit 14, and thence flows into annular chamber 70, and from there downwardly, as indicated by arrows 89, through the valve guide body 44 below the valve head 42, to chamber 68 and from there through the outer segmental annular passage 34 in the tank attachment fitting 26 into the top end of the water softener tank 10. From the top of the water softener tank 10, the raw water passes downwardly through the zeolite bed 242, through the gravel filter body 244, up through manifold pipe 36, through passage 32 of the base section 20 of the control valve body, thereby automatically forcing the slide valve assembly 90 upwardly off its seat 99 on the top end of the valve guide 86, against the opposing force of valve spring 100, and thence, the water flows through the opened valve into the surrounding, annular chamber 84 and from there out through the rearwardly directed outlet passage 104, outlet port 106 and soft water outlet pipe 108.

Since the upward movement of the side valve assembly 90 is opposed by the valve spring 100, the distance the valve head 92 is raised off its valve seat 99 and the resulting differential pressure thereacross, will be a function of the rate of flow of softened water therethrough.

At the time when there is no demand for softened water, there will be no flow of softened water through the valve 92, 99 and consequently, there will be no substantial differential pressure between the upstream and downstream sides thereof. In other words, the pressure below the closed valve head 92 will be equal to the pressure above the closed valve head 92 and in the surrounding annular chamber 84. Consequently, since the said space below the valve head 92 is in communication with the annular depression 174 below the lower surface of the regulator diaphragm 166 by way of ducts 240, 238, bottom bore section 152, annular space 203 between the metering valve aperture 202 and the metering pin 232, cylindrical cavity 200, and duct 204, the pressure in the aforesaid annular depression 174 will be the same as the pressure below the valve head 92. Similarly, since the chamber 84 is in communication with the cylindrical recess 184, above the upper surface of the regulator diaphragm 166 by way of ducts 222, 220, and 218, the liquid pressure applied to the top surface of the regulator diaphragm 166 will be equal to the liquid pressure in chamber 84. Thus, when there is no flow through the valve 92, 99 the liquid pressure on the upper and lower surfaces of the regulator diaphragm 166 will be equal. Under these static conditions, the center lower surface of the regulator diaphragm 166 will rest in sealing engagement with the upper end surface of the diaphragm valve seat 178 with a force which is adjustably determined by the regulator valve spring 180, and under such condition, escape of liquid from the annular depression 174 below the diaphragm 156 into the vertical duct 206 in the diaphragm valve seat 178, is prevented.

Upon demand for softened water, with resultant flow of softened water upward through the valve 92, 99 the resultant pressure differential between the downstream and upstream sides of the valve 92, 99 is communicated through the beforementioned ducts to the respective upper and lower surfaces of the regulator diaphragm 166, resulting mainly in a lowering of the liquid pressure upon the upper surface of the regulator diaphragm 166. As a result of this latter differential pressure across the regulator diaphragm 166, the diaphragm tends to lift off of the upper end surface of the diaphragm valve seat 178, to permit liquid to escape from the annular depression 174, out through the duct 206.

Such escape of liquid from the annular depression 174 passed the regulator diaphragm 166 into the duct 206, immediately reduces the pressure in the annular depression 174, tending to re-establish equilibrium between the liquid pressures on the upper and lower surfaces of the regulator diaphragm 166 in such manner as to tend to reseat the central lower surface of the diaphragm 166 upon the upper end of the diaphragm valve seat 178 and thereby prevent further escape of liquid out through duct 206. This reduction in pressure in the annular depression 174 on the lower side of the diaphragm 166 results from the drop in pressure occuring, by reason of the flow of liquid to the annular depression 174 to make up for that escaping through the duct 206, such drop in pressure resulting from the resistance to flow of the liquid through the relatively small clearance space 203 between the inside surface of the metering valve aperture 202 and the adjacent outside surface of the tapered metering pin 232. For convenience of description the variable clearance space 203 between the inside surface of the metering valve aperture 202 and the adjacent outside surface of the tapered metering pin 232 is hereinafter referred to as the metering valve passage 203. The overall result of this action is to establish a predetermined, substantially constant differential pressure across the metering valve passage 203, whenever any flow therethrough occurs.

Since the height which the valve head 92 of the valve assembly 90 is raised off its valve seat 99 is a function of the rate of flow of softened water therethrough, the height to which tapered metering pin 232 is thereby simultaneously raised relative to the adjacent surrounding metering valve aperture 202, is likewise a function of the rate of such flow of softened water. Consequently, the area of the metering valve passage 203 will be a function of the rate of flow of the demanded softened water. As beforementioned, inasmuch as the pressure differential occuring across the metering valve passage 203 thus determined between the inside surface of the metering valve aperture 202 and the adjacent outside tapered surface of the metering pin 232, is maintained substantially constant by the action of the regulator action of the regulator diaphragm assembly 164, then the flow through the metering valve passage 203, and the quantity of liquid which escapes from the annular depression 174, into the duct 206 in the regulator valve seat 178 will accordingly be solely a function of the rate of flow of the demanded softened water and independent of the gauge pressure of the raw water supply.

By suitably designing the shape of the taper of the metering pin 232, the functional relationship between the rate of flow of liquid through the metering valve passage 203 and the rate of flow of softened water to the demand, can be made substantially directly proportional to one another.

The liquid which flows or escapes as hereinbefore described, from the annular depression 174, between the regulator diaphragm 166 and the diaphragm valve seat 178 into the outlet duct 206, passes therefrom through duct 208, annular groove 210, outlet port 214, control valve 216, pipe 218 and discharge 310, onto the tray 304, which, as hereinbefore described, is pivotally supported within the upper end portion of the brine generating and storage tank 12. Inasmuch as the tray 304, at this stage of the operation, is in the position indicated by broken lines 304a, the escaped liquid thus falling on the tray 304 is initially diverted into the top of the rock salt storage compartment 256 from which it percolates down through the rock salt therein and flows through the perforations 260 into the brine well 258. The amount of liquid thus flowing from the pipe 218 into tank 12 is, as hereinbefore explained, a predetermined function of, or preferably, proportional to the integrated product of the simultaneous rate and time of flow of softened water to the demand facilities. In other words, the quantity of water introduced into the brine generating and storage tank 12 through the pipe 218 is a function of, preferably proportion to, the quantity of hard water passed through the zeolite, and the actual ratio of the quantity of water thus accumulated in the brine generating and storage tank 12, relative to the quantity of raw water passed through the zeolite can thereby be automatically regulated and controlled such that the resulting quantity of brine generated in tank 12 by dissolving of the rock salt therein in the accumulated water approximately equals that which would be required at any given time, to regenerate the water softening material at such given time, for water of a given hardness. Such ratio of the quantity of accumulator water to the quantity of raw water softened is obtained by proper design of the metering valve 151 as hereinbefore described and by suitable adjustments of the regulator valve by the adjustment screw 186.

After a suitable period of time, when the quantity of water thus introduced into the brine generating and storage tank 12, is sufficient to bring the liquid level therein up to that indicated at 310, at which level the float 308 is buoyed upwardly from the position indicated in broken lines at 308a to that indicated in solid lines at 308, the tray 304 is thereby permitted to pivot from the position shown in broken lines at 304a to that position shown in solid lines at 304. Following this, the continued flow of water from the pipe 218 out through discharge 311, will be diverted by the tray 304 into the inlet opening 274 of the control bucket 270. Since the capacity of the control bucket is relatively small, as compared to that of the total capacity of tank 12, the amount of liquid thus accumulated therein, will soon reach a critical weight at which the tension of spring 94 can no longer support the increasing weight of the contents of the control bucket 207, and the arm 85 suddenly pivots downwardly in a snap action which brings the cross pin 83 against the lower end of the slot 81 thereby, suddenly opening the drain valve 65 and simultaneously bringing the spring retainer nut 292 of the dump valve 276 in the bottom of the control bucket 270, into forceful contact with the dump valve actuating bracket 298, thereby also opening the dump valve 276. The interval of time during which the valves 65 and 276 will remain open will be determined by the time required for the liquid accumulated in the control bucket 270, to flow out through aperture 296, and thereby reduce the weight thereof sufficiently to permit spring 94 to pivotally return the valve actuating lever 85 to its upper position in a snap action in reverse to that just described, which will result in the closing of both the dump valve 276 and the drain valve 65.

During the just described interval of time, during which the drain valve 65 remains open, a path for flow of water is initially provided from the space below the valve piston 50, within the bore 57 of the annular valve sleeve 54, out through the outlet port 62 and thence, through the drain pipe 61, to a suitable disposal means. The resultant drop in pressure of the liquid below the valve piston 50 relative to the pressure of the liquid thereabove in chamber 68, forces the slide valve assembly 40 downwardly against the opposing force of spring 73, to a position in which the lower surface of the valve seal ring 75 carried on the lower surface of the valve head 42, is brought into sealing engagement with the valve seat 55 on the upper annular end of the valve guide 53, thus shutting off the flow of raw water from the inlet pipe 80 into the chamber 68. In the absence of withdrawal of water through outlet 108, the pressure on both the upper and lower sides of valve head 42 is equal and the valve is thus balanced except for the force exerted by spring 73. Such downward displacement of the slide valve assembly 40 positions the valve piston 50 below the ports 60 in the valve sleeve 54, thus interconnecting the annular space 58, surrounding the annular valve sleeve 54 with the beforementioned chamber 68. A way is thus completed for flow of liquid (expended regenerating brine and wash water which has passed upwardly through the zeolite 242) from the top of the water softener tank 10 through passages 34, chamber 68, ports 60, annular space 58, duct 63, valve cavity 64 (see FIGURE 6), and duct 66, to the drain outlet port 62 and thence, out through the drain-pipe 61 as aforesaid.

The downward displacement of the slide valve assembly 40, as just described, places the raw water inlet pipe 80 in communication with the chamber 82, from which raw water is able to flow into the annular chamber 84, and from there directly out through the soft water outlet port 106 and pipe 108, and also through the lateral passage 128 to the inlet of the jet nozzle 116 of the jet pump 114. The rate of such flow to the jet nozzle 116 may be suitably adjusted by the nozzle flow adjustment valve screw 130. From the lower end of the jet nozzle 116, such water is injected into the upper end of the expansion passage 112 and passes downward therethrough and out through the lateral duct 110 into the top of passage 32 leading to the upper end of manifold pipe 36.

As a result of the action of jet pump 114, brine is withdrawn from the brine well 258 through the float valve 144 and through connecting tubing 126 into the inlet port 124 of the control valve unit 14, and thence, flows through duct 125, check valve 123 (see FIGURE 5), in the direction indicated by arrow 127, ducts 122 and 120 into the suction inlet 119 of the jet pump 114, where it is drawn into and intermixes with the raw water injected from the jet nozzle 116. The resultant mixture of brine and raw water discharged from the jet pump 114, flows through the lateral duct (see FIGURE 3) and the passage 32 into the top of the manifold pipe 36, as hereinbefore described, and from there the brine mixture passes out of the lower end of the manifold pipe 36 and upwardly through the zeolite bed 242 to the top of tank 10 to effect the regeneration of the zeolite. The raw water and expended brine mixture thus reaching the top of the water softener tank 10 flows out through annular passages 34, and from there, to the drain pipe 61, as hereinbefore described.

The time duration of the zeolite regeneration step is determined by and is equal to the time interval between the occurrence of the downward displacement of the control bucket 270 resulting from the accumulation of liquid therein, to the completion of the draining of the brine from the brine tank 12 sufficiently to lower the liquid level thereof from the full level indicated at 310, to a lower lever indicated at 312, slightly above the inlet to the float valve 144, at which the float 266 of the float valve 144 causes the float valve 144 to close, thereby cutting off further flow of brine and preventing the intake of air to the jet pump 114. After thus cutting off the supply of brine to the jet pump 114, the raw water without the brine, continues to flow to the inlet of the jet pump 114 and thence from the discharge of the jet pump, into and through the zeolite 242 in tank 10 to effect the zeolite washing step for removal of the brine therefrom.

Upon completion of the draining of the accumulated liquid from the control bucket 270 and its return to its elevated position accompanied by the upward movement of the valve actuating lever 85 and the closing of the valve 65, the slide valve assembly 40 no longer being subject to the beforementioned differential pressure across the valve piston 50 is permitted under the force of spring 73 to return to its upwardly closed position as shown in FIGURE 3, thereby restoring the interconnection between the top of the water softener tank 10 and the raw water inlet port 78, and at the same time, cutting off communication between the raw water inlet port 78 and the inlet passage 128 to the jet pump 114 thereby terminating the zeolite washing steps. Under the latter conditions, softened water upwardly under pressure from the manifold pipe 36 is free to flow up through the valve 92, 99 of the slide valve assembly 90 into the annular chamber 84 and thence, out through the rearwardly directed passage 104 to the outlet port 106, and therefrom through the softened water outlet pipe 108. Such flow of softened water through the valve 92, 99 results in a flow of a predetermined amount of such water past the metering valve and thence, through pipe 218 to the brine generating and storage tank 12 as hereinbefore described, again to restore the quantity and return the liquid level of the brine therein to that shown at 310, in preparation for the next zeolite regeneration step in the following cycle of operations.

Briefly recapitulating the sequence and time duration of the several steps in each cycle of operation of the water softening system, they are as follows:

(a) The duration of the water softening step, of the cycle, for a given amount of water softening material and a given size of brine generating storage tank, is determined by the time required for water introduced through pipe 218 into the brine generating and storage tank 12, to raise the liquid level therein from the minimum level, illustrated by the dotted line 312, which it had at the completion of a prior zeolite regeneration step, to its maximum height indicated at 310, plus the time required to accumulate sufficient water in the control bucket 270 to actuate the valves 65 and 276, which initiate the regeneration step.

(b) The duration of the regeneration step of the cycle is determined by the time required for the liquid level of brine in tank 12 to be lowered from the full liquid level indicated at 310, to the minimum liquid level indicated at 312, at which the float valve 144 closes, thereby terminating further withdrawal of brine from the tank 12.

(c) The duration of fresh water washing of the regenerated zeolite is determined by the time interval, in excess of that for lowering the brine in the brine tank as aforesaid, required for emptying the control bucket 270.

If, at any time, it is desired to suspend the automatic operation of the water softening system, such as for example, just prior to the occurrence of a regeneration portion of the cycle and when a continued supply of softened water may be desired, then the control valve 216 may be closed, preventing flow of liquid through the metering valve, and thence through the pipe 218 to the brine generating and storage tank 12. Such stoppage of the flow of water to the brine generating and storage tank 12 will suspend operation of the automatic features thereof including that of the automatic control apparatus 16, thereby delaying the regenerating portion of the cycle, until the valve 216 is again opened.

A tell tale rod 328 attached to one end of the tray 304 and extending slidably through an opening 330 in the cover 252 of the brine tank 12 serves to indicate by its appearance above the top of the cover 252, when the tray pivots from the position shown at 304a to the position shown at 304 which is indicative of an impending regeneration step in the cycle of operations.

If, at any time, it is desired to make available large quantities of unsoftened water, such as, for example, for lawn watering, this is accomplished by rotating control knob 322 in a right-hand direction as viewed from above, thereby moving the lower end 320 of the control plunger 318 against the upper surface of the valve head 42 and depressing the valve head 42 against the force of spring 73 to a position at which the lower edge thereof is seated in closed engagement with the valve seat 55. The raw water supply pipe 80 is thereby put in direct communication with the outlet pipe 108, and under such condition, while the drain valve 65 remains closed, no water is metered through line 218, no water will flow through the jet pump 114, and no water will flow out through the drain port 62.

Various materials may be employed for the manufacture of the components of the hereinbefore described system. It is contemplated that the water softener tank 10, the brine tank 12, the cycling control valve unit 14, and the control bucket 270, will be largely composed on injection molded, plastics material components. The construction of the cycle control valve 14 has been designed, as herein shown, to particularly adapt it to high pressure injection molding manufacturing techniques. Materials which have been found to be suitable have been plastic, such as Celanese and Delrin. Celanese and Delrin are trade names for thermo-plastic materials manufactured by Celanese Plastics Corporation and E. I. du Pont de Nemours & Co., Inc., respectively.

It is to be understood that the foregoing is illustrative only and that the invention is not limited thereby, but may include various modifications and changes by those skilled in the art within the scope of the invention, as defined in the appended claims.

I claim:
1. In an automatic water softening system, apparatus comprising:
- a container for containing water softening materials;
- means for directing the flow of water to be softened through said container for contact with water softening material therein;
- means responsive to such flow of water for simultaneously accumulating a quantity of regenerating liquid at a rate which is a predetermined function of the rate of flow of such water through said container;
- means actuatable by the thus accumulating quantity of regenerating liquid, when the quantity thereof reaches a predetermined amount, for interrupting such flow of water through said container and for flowing a first portion of the thus accumulated regenerating liquid through said container;
- means responsive to the completion of flow of said predetermined first portion of such accumulated regenerating liquid through said container for discontinuing such flow of regenerating liquid through said container and simultaneously initiating flow of fresh wash water through said container which is relatively free of regenerating liquid;
- and means actuated by completion of flow of a second predetermined portion of said accumulated liquid for interrupting such initiated flow of fresh wash water through said container.

2. In an automatic water softening system, apparatus comprising:
- a container for containing water softening materials;
- means for directing the flow of water to be softened through said container for contact with water softening material;
- means responsive to such flow of water for simultaneously accumulating a quantity of liquid at a rate which is a predetermined function of the rate of flow of such water through said container;
- means actuatable by the thus accumulating quantity of liquid, when the quantity thereof reaches a predetermined amount, for interrupting such flow of water through said container and for flowing at least a portion of such accumulated liquid through said container;
- means responsive to the completion of flow of a predetermined first portion of such accumulated liquid through said container for discontinuing such flow of liquid through said container and for initiating flow of substantially fresh wash water through said container;
- means actuated upon completion of flow of a second predetermined portion of such accumulated liquid for interrupting such initiated flow of fresh wash water through said container,
- and for re-establishing the aforesaid flow of water to be softened through said container.

3. In an automatic water softening system, apparatus comprising:
- a container for containing water softening materials;
- means for directing the flow of water to be softened through said container for contact with water softening material;
- means responsive to such flow of water for simultaneously accumulating a quantity of liquid at a rate which is a predetermined function of the rate of flow of such water through said container;
- means actuatable by the thus accumulating quantity of liquid, when the quantity thereof reaches a predetermined amount, for interrupting such flow of water through said container and for flowing the thus accumulated liquid through said container in a direction in reverse to that of the said flow of water therethrough;
- means responsive to the completion of flow of a predetermined first portion of such accumulated liquid through said container for discontinuing such flow of liquid through said container and for initiating flow of substantially fresh wash water through said container;
- means actuated upon completion of flow of a second predetermined portion of such accumulated liquid for interrupting such initiated flow of fresh wash water through said container,
- and for re-establishing the aforesaid flow of water to be softened through said container.

4. In an automatic water softening system, apparatus comprising:
- a first container for containing water softening material;
- a second container for containing a body of water soluble regenerating material for which when dissolved in water forms a regenerating solution for such water softening material;
- control valve means, said control valve means being positionable in a first position for directing flow of water from a source of supply through said first container for contact with such water softening material therein and thence to a point of consumption, and positionable in a second position for interrupting such flow through said first container and for directing flow of such water from such source of supply direct to said point of consumption;
- means responsive to the rate of such flow of water through said first container when said control valve is in said first position for constantly diverting from such flow of water a predetermined fractional portion thereof;
- means for introducing such diverted water into said second container and for directing it into contact with such body of soluble material therein for forming and accumulation therein of a quantity of such regenerating solution;
- means in said second container responsive to and actuatable upon such accumulation therein of a predetermined quantity of such regenerating solution for interrupting such introduction of such diverted water into said second container into contact with such body of soluble material therein for positioning said control valve means in said second position to interrupt such flow through said first container of water from said source as aforesaid;
- and means responsive to such positioning of said valve means in said second position for causing regenerating solution thus accumulated in said second container to be withdrawn therefrom and to flow through said first container for regenerating contact with water softening material therein and thence to flow to a disposal means.

5. In an automatic water softening system, apparatus comprising:
- a first container for containing water softening material;
- a second container for containing regenerating solution for regenerating such water softening material;
- a third container;
- control valve means, positionable in a first position for directing flow of water to be softened from a source of supply through said first container for contact with such water softening material therein, and positionable in a second position for interrupting such flow through said first container;
- means responsive to the rate of such flow of water through said first container when said control valve is in said first position for constantly diverting from such flow a predetermined fractional portion thereof;
- means for introducing such diverted water into said second container for accumulation therein;

means in said second container responsive to and actuatable upon such accumulation therein of a predetermined quantity of such diverted water for interrupting such introduction of such diverted water into said second container and for introduction of such diverted water into said third container;

control means responsive to and actuatable upon the accumulation of a predetermined maximum weight of such diverted water in said third container for positioning said control valve means in said second position to interrupt flow through said first container of water to be softened and including means for causing water accumulated in said second container to be withdrawn therefrom and to flow through said first container for contact with water softening material therein and thence to flow to a disposal means;

means responsive to such withdrawal of a predetermined quantity of such accumulated water from said second container for interrupting such withdrawal and flow thereof through said first container, and for initiating flow, from said source of supply, of fresh wash water substantially free of such accumulated water from said second container, through said first container, and thence to flow to a disposal means;

means responsive to the said actuation of said control means for initiating discharge of such accumulated water from said third container at a controlled rate whereby, upon lapse of a predetermined period of time following such actuation of said control means, said accumulated water in said third container is reduced from said predetermined maximum weight to a predetermined minimum weight;

said control means being also responsive to and actuatable upon such reduction of such accumulated water in said third container to such predetermined minimum weight for positioning said control valve means in said first position, thereby to discontinue flow of such wash water through said first container and to resume directing flow of water to be softened from said source of supply through said first container and for diverting from such flow a predetermined fractional portion thereof for repetition of the cycle as aforesaid.

6. In an automatic water softening system, apparatus comprising:

a first container for containing water softening material;

a second container for containing a body of water soluble regenerating material for which when dissolved in water forms a regenerating solution for such water softening material;

a third container;

control valve means, positionable in a first position for directing flow of water to be softened from a source of supply through said first container for contact with such water softening material therein, and positionable in a second position for interrupting such flow through said first container;

means responsive to the rate of such flow of water through said first container when said control valve is in said first position for constantly diverting from such flow a predetermined fractional portion thereof;

means for introducing such diverted water into said second container into contact with such soluble material for the generation and accumulation therein of a quantity of regenerating solution;

means in said second container responsive to and actuatable upon such accumulation therein of a predetermined quantity of such regenerating solution for interrupting such introduction of such diverted water into said second container and for introduction of such diverted water into said third container;

control means responsive to and actuatable upon the accumulation of a predetermined maximum weight of such diverted water in said third container for positioning said control valve means in said second position to interrupt such flow through said first container of water to be softened and including means for causing solution accumulated in said second container to be withdrawn therefrom and to flow through said first container for contact with water softening material therein and thence to flow to a disposal means;

means responsive to such withdrawal of a predetermined quantity of such accumulated solution from said second container for interrupting such withdrawal and flow thereof through said first container, and for initiating flow, from said source of supply, of fresh wash water substantially free of such accumulated solution from said second container, through said first container, and thence to flow to a disposal means;

means responsive to the said actuation of said control means for initiating discharge of such accumulated water from said third container at a controlled rate whereby, upon lapse of a predetermined period of time following such actuation of said control means, said accumulated water in said third container is reduced from said predetermined maximum weight to a predetermined minimum weight;

said control means being also responsive to and actuatable upon such reduction of such accumulated water in said third container to such predetermined minimum weight for positioning said control valve means in said first position, thereby to discontinue flow of such wash water through said first container and to resume directing flow of water to be softened from said source of supply through said first container and for diverting from such flow a predetermined fractional portion thereof for repetition of the cycle as aforesaid.

7. In an automatic water softening system, apparatus comprising:

a first container for containing water softening material;

a second container for containing regenerating solution for regenerating such water softening material;

a third container contained within said second container;

control valve means, positionable in a first position for directing flow of water to be softened from a source of supply through said first container for contact with such water softening material therein, and positionable in a second position for interrupting such flow through said first container;

means responsive to the rate of such flow of water through said first container when said control valve is in said first position for constantly diverting from such flow a predetermined fractional portion thereof;

means for introducing such diverted water into said second container for accumulation therein;

means in said second container responsive to and actuatable upon such accumulation therein of a predetermined quantity of such diverted water for interrupting such introduction of such diverted water into said second container and for introduction of such diverted water into said third container;

control means responsive to and actuatable upon the accumulation of a predetermined maximum weight of such diverted water in said third container for positioning said control valve means in said second position to interrupt flow through said first container of water to be softened and including means for causing water accumulated in said second container to be withdrawn therefrom and to flow through said first container for contact with water softening material therein and thence to flow to a disposal means;

means responsive to such withdrawal of a predetermined quantity of such accumulated water from said second container for interrupting such withdrawal and flow thereof through said first container, and for initiating flow, from said source of supply, of fresh
wash water substantially free of such accumulated
water from said second container, through said first
container, and thence to flow to a disposal means;

means responsive to the said actuation of said control
means for initiating discharge of such accumulated
water from said third container into said second container at a controlled rate whereby, upon lapse of a
predetermined period of time following such actuation of said control means, said accumulated water
in said third container is reduced from said predetermined maximum weight to a predetermined minimum weight;

said control means being also responsive to and actuatable upon such reduction of such accumulated
water in said third container to such predetermined
minimum weight for positioning said control valve
means in said first position, thereby to discontinue
flow of such wash water through said first container
an to resume directing flow of water to be softened
from said source of supply through said first container and for again diverting from such resumed
flow a predetermined fractional portion thereof for
repetition of the cycle as aforesaid.

8. In an automatic water softening system, apparatus comprising:
a first container for containing water softening material;
a second container for containing a body of water soluble regenerating material which when dissolved in water forms a regenerating solution for such water softening material;
a third container;
control valve means, said control valve means being positionable in a first position for directing flow of water from a source of supply through said first container for contact with such water softening material therein and thence to a point of consumption, and said control valve being positionable in a second position for interrupting such flow through said first container and for directing flow of such water from such source of supply directly to said point of consumption;
means responsive to the rate of such flow of water through said first container when said control valve is in said first position for constantly diverting from such flow of water a predetermined fractional portion thereof;
means for introducing such diverted water into said second container and for directing it into contact with such body of soluble material therein for forming and accumulation therein of a quantity of such regenerating solution;
means in said second container responsive to and actuatable upon such accumulation therein of a predetermined quantity of such regenerating solution for interrupting such introduction of such diverted water into said second container into contact with such body of soluble material, and for introduction of such diverted water into said third container;
control means responsive to and actuatable upon the accumulation of a predetermined maximum weight of such diverted water in said third container for positioning said control valve means in said second position to interrupt such flow through said first container of water from said source as aforesaid;
means responsive to such positioning of said valve means in said second position for causing regenerating solution thus accumulated in said second container to be withdrawn therefrom and to flow through said first container for regenerating contact with water softening material therein and thence to flow to a disposal means;

means responsive to such withdrawal of a predetermined quantity of such accumulated regenerating solution from said second container for interrupting such withdrawal and flow thereof through said first container, and for initiating flow, from said source of supply, of fresh wash water substantially free of such accumulated, regenerating solution from said second container, through said first container, and thence to flow to a disposal means;

means responsive to the said actuation of said control means for initiating discharge of such accumulated water from said third container at a controlled rate whereby, upon lapse of a predetermined period of time following such actuation of said control means, said accumulated water in said third container is reduced from said predetermined maximum weight to a predetermined minimum weight;

said control means being also responsive to and actuatable upon such reduction of such accumulated water in said third container to such predetermined minimum weight for positioning said control valve means in said first position, thereby to discontinue flow of such wash water through said first container and to resume directing flow of water from said source of supply through said first container and for again diverting from such resumed flow a predetermined fractional portion thereof for repetition of the aforesaid cycle.

9. In an automatic water softening system, apparatus comprising:
a first container for containing water softening material;
a second container for containing a body of water soluble regenerating material which when dissolved in water forms a regenerating solution for such water softening material;
a third container;
control valve means, said control valve means being positionable in a first position for directing flow of water from a source of supply through said first container for contact with such water softening material therein and thence to a point of consumption, and said control valve being positionable in a second position for interrupting such flow through said first container and for directing flow of such water from such source of supply directly to said point of consumption;
means responsive to the rate of such flow of water through said first container when said control valve is in said first position for constantly diverting from such flow of water a predetermined fractional portion thereof;
means for introducing such diverted water into said second container and for directing it into contact with such body of soluble material therein for forming and accumulation therein of a quantity of such regenerating solution;
means in said second container responsive to and actuatable upon such accumulation therein of a predetermined quantity of such regenerating solution for interrupting such introduction of such diverted water into said second container into contact with such body of soluble material, and for introduction of such diverted water into said third container;
control means responsive to and actuatable upon the accumulation of a predetermined maximum weight of such diverted water in said third container for positioning said control valve means in said second position to interrupt such flow through said first container of water from said source as aforesaid;
a jet pump means having a jet inlet, a suction inlet and a discharge outlet;
means connecting said suction inlet to said second container;

means connecting said discharge outlet with said first container;

means responsive to such positioning of said control valve means in said second position for connecting said source of supply of water to said jet inlet, and thence through said discharge outlet to said first container, whereby regenerating solution accumulated in said second container may be withdrawn therefrom to the said suction inlet of said jet pump and discharged therefrom, together with water introduced into said jet inlet through said first container for contact with water softening material therein and thence flow to a disposal means;

means responsive to such withdrawal of a predetermined quantity of such regenerating solution from said second container for interrupting such withdrawal of regenerating solution therefrom while permitting continued flow of water from the discharge outlet of said jet pump to flow through said first container, and thence to flow to a disposal means;

means responsive to the said actuation of said control means for initiating discharge of such accumulated water from said third container at a controlled rate whereby, upon lapse of a predetermined period of time following such actuation of said control means, said accumulated water in said third container is reduced from said predetermined maximum weight to a predetermined minimum weight;

said control means being also responsive to and actuatable upon such reduction of such accumulated water in said third container to such predetermined minimum weight for positioning said control valve means in said first position, thereby to discontinue flow of such water to the jet inlet and thence, through said first container, and to resume directing flow of water from said source of supply through said first container and for again diverting from such resumed flow a predetermined fractional portion thereof for repetition of the cycle as aforesaid.

10. In an automatic water softening system, apparatus comprising:

a first container for containing water softening material;

a second container for containing regenerating solution for regenerating such water softening material;

a third container;

means for directing flow of water to be softened through said first container for contact with such water softening material;

means responsive to such flow of water through said first container for diverting a quantity of liquid into said second container at a rate which is a predetermined function of the rate of flow of such water through said container;

means responsive to and actuatable upon such accumulation in said second container of such predetermined quantity of liquid for initiating accumulation of liquid in said third container;

control means responsive to and actuatable upon the accumulation of a predetermined maximum weight of such liquid in said third container for interrupting such flow through said first container of water to be softened and for causing liquid accumulated in said second container to be withdrawn therefrom and to flow through said first container for contact with water softening material therein;

means responsive to such withdrawal of a predetermined quantity of such accumulated liquid from said second container for interrupting such withdrawal and flow thereof through said first container, and for initiating flow of fresh wash water substantially free of such accumulated liquid through said first container;

means responsive to said accumulation of said predetermined weight of liquid in said third container for initiating discharge of such accumulated liquid from said third container at a controlled rate whereby, upon lapse of a predetermined period of time following such actuation of said control means, said accumulated liquid in said third container is reduced from said predetermined maximum weight to a predetermined minimum weight, said control means being also responsive to and actuatable upon such reduction of such accumulated liquid in said third container to such predetermined minimum weight for discontinuing flow of such wash water through said first container and for resuming the directing of flow of water to be softened through said first container.

References Cited by the Examiner

UNITED STATES PATENTS

| | | | |
|---|---|---|---|
| 2,999,514 | 9/1961 | Kryzer | 210—278 X |
| 3,007,495 | 11/1961 | Whitlock | 210—138 X |
| 3,048,274 | 8/1962 | Lundeen | 210—101 |
| 3,066,801 | 12/1962 | Lundeen | 210—191 X |
| 3,079,949 | 3/1963 | Lundeen | 210—278 X |

REUBEN FRIEDMAN, *Primary Examiner.*

D. M. RIESS, *Assistant Examiner.*